US012643202B2

(12) United States Patent
Wentworth et al.

(10) Patent No.: US 12,643,202 B2
(45) Date of Patent: Jun. 2, 2026

(54) JAW ENGAGEMENT ASSIST SYSTEM

(71) Applicant: The Charles Machine Works, Inc., Perry, OK (US)

(72) Inventors: Steven W. Wentworth, Scottsdale, AZ (US); Mark D. Randa, Oconomowoc, WI (US); Robert F. Crane, Nekoosa, WI (US); James B. Doyle, Jr., Delafield, WI (US)

(73) Assignee: The Charles Machine Works, Inc., Perry, OK (US)

( * ) Notice: Subject to any disclaimer, the term of this patent is extended or adjusted under 35 U.S.C. 154(b) by 531 days.

(21) Appl. No.: 18/303,850

(22) Filed: Apr. 20, 2023

(65) Prior Publication Data

US 2023/0339077 A1 Oct. 26, 2023

Related U.S. Application Data

(60) Provisional application No. 63/333,694, filed on Apr. 22, 2022.

(51) Int. Cl.
*B25B 7/02* (2006.01)
*B25B 7/14* (2006.01)

(52) U.S. Cl.
CPC . *B25B 7/02* (2013.01); *B25B 7/14* (2013.01)

(58) Field of Classification Search
CPC ..... B25B 7/02; B25B 7/14; B66D 5/16; F16L 55/1658; H02G 1/08
USPC ................ 81/146, 148, 342; 294/86.5, 102.1
See application file for complete search history.

(56) References Cited

U.S. PATENT DOCUMENTS

| | | | | | |
|---|---|---|---|---|---|
| 922,814 | A * | 5/1909 | Reece | B21C 1/14 | 294/102.1 |
| 1,357,576 | A * | 11/1920 | Martet | F16B 7/1463 | 81/148 |
| 4,003,203 | A | 1/1977 | Vural | | |
| 4,604,938 | A | 8/1986 | Kennedy et al. | | |
| 4,955,757 | A | 9/1990 | Balling | | |
| 5,205,671 | A | 4/1993 | Handford | | |
| 5,417,290 | A | 5/1995 | Barrow | | |
| 5,549,170 | A | 8/1996 | Barrow | | |
| 6,076,236 | A * | 6/2000 | DeFrance | F16G 11/048 | 294/102.1 |
| 6,276,250 | B1 | 8/2001 | Ayling et al. | | |
| 6,443,657 | B1 | 9/2002 | Brahler | | |
| 6,817,909 | B2 * | 11/2004 | Dobrinski | H01R 4/5083 | 439/783 |
| 7,032,429 | B1 | 4/2006 | McDougle | | |
| 7,128,499 | B2 | 10/2006 | Wentworth | | |
| 8,277,147 | B2 | 10/2012 | Cilliers | | |
| 8,474,795 | B2 | 7/2013 | Tjader | | |

(Continued)

*Primary Examiner* — Hadi Shakeri
(74) *Attorney, Agent, or Firm* — Tomlinson McKinstry, P.C.

(57) ABSTRACT

An apparatus for gripping and pulling a wire strand. The apparatus is carried by a cylinder assembly attached to a frame. The cylinders provide force to pull the strand. Jaws are situated in a jaw block, and are tapered such that movement of the jaw block by the cylinders will tend to force the jaws closer to one another within a tapered cavity. Movable, spring-loaded J-rods are provided to retain the jaws within the jaw block when desired. The J-rods can be rotated to a position which does not retain the jaws when the wire strand is being added to, or removed from, the apparatus.

17 Claims, 7 Drawing Sheets

(56) References Cited

U.S. PATENT DOCUMENTS

| | | | | |
|---|---|---|---|---|
| 10,550,961 | B2 | 2/2020 | Nippes | |
| 10,584,807 | B2 | 3/2020 | Wentworth et al. | |
| 11,112,033 | B2 | 9/2021 | Crane et al. | |
| 11,796,115 | B1 | 10/2023 | Herrick et al. | |
| 11,919,738 | B1 * | 3/2024 | Herrick | H02G 1/081 |
| 2002/0081155 | A1 | 6/2002 | Putnam | |
| 2019/0049042 | A1 | 2/2019 | Wentworth et al. | |
| 2021/0107074 | A1 * | 4/2021 | Randa | F16L 55/1658 |

* cited by examiner

JAW ENGAGEMENT ASSIST SYSTEM

SUMMARY

The present invention is directed to a gripping assembly. The gripping assembly comprises a tapered jaw, a block having a tapered cavity, and a retainer. The tapered jaw has at least one tapered surface. The tapered cavity comprises at least one tapered surface complementary to the tapered surface of the tapered jaw. The retainer comprises a first section and a second section. The first section is disposed within the block. The second section is offset from the first section and defined by a first position and a second position. The retainer contacts the tapered jaw when in the first position and does not contact the tapered jaw when in the second position. The tapered jaw is situated within the tapered cavity.

In another aspect, the invention is directed to a gripping assembly. The gripping assembly comprises a jaw block, a subassembly, a first retainer, and a second retainer. The jaw block defines a tapered cavity, wherein the tapered cavity defines first and second opposed surfaces. The subassembly comprises a plate, a first tapered jaw, and a second tapered jaw.

The plate is slidingly receivable in the jaw block and defines first and second slots. The first tapered jaw is secured to the plate by a first pin, where the first pin is disposed through the first slot. The first tapered jaw defines a first crush face and a first tapered jaw surface. The second tapered jaw is secured to the plate by a second pin, wherein the second pin is disposed through the second slot. The second tapered jaw defines a second crush face and a second tapered jaw surface. The first tapered jaw and second tapered jaw are situated within the tapered cavity such that the first crush surface and second crush surface are opposed, the first tapered jaw surface is adjacent and complementary to the opposed tapered surface of the tapered cavity, and the second tapered jaw surface is adjacent and complementary to the second opposed tapered surface of the tapered cavity.

The first retainer and second retainer are each disposed through the jaw block. Each retainer has a first position and a second position. The retainers engage the jaws such that their tapered jaw surfaces are biased toward the respective opposed tapered surfaces of the tapered cavity when the retainers are in the first position.

DETAILED DESCRIPTION

Wire rope or rod gripping systems used for replacement of underground utilities are well known. A wire rope or rod is typically used to pull tooling through an existing pipe that will crack, split, slit or remove the pipe where it is buried while towing an expander to open the adjacent soil and permit the new product to be pulled along into the bore after the tooling passes.

In many gripping systems, a tapered jaw or jaws are designed to slide in a matching tapered jaw block. As the force between the jaw face contacting the strand increases, the jaw taper is forced deeper into the jaw block taper thereby increasing the squeezing force on the wire rope and therefore the friction to hold it in position relative to the jaw block.

The challenge of the process is often initiating the force between the tapered jaw and the pulling wire rope or strand. A modest amount of externally applied force will initiate the gripping; that modest force then grows as the jaw block is moved to pull the strand and the jaws will wedge with this pulling movement.

While the primary job of the jaws is to grip the strand, at the start and end of the job, the strand must be placed between the jaws or between one jaw and a friction face. In order to accomplish that the jaws need to be removed from the jaw block or slide a meaningful distance toward the open end of the tapered faces in the jaw block. This strand installation and removal process occurs at the start and end of every pull. Permanently installed springs or hydraulic actuators impede the distance the jaws can slide. In these applications, the installation and removal of the strand is extremely difficult. Only long throw actuators facilitate the beginning and end process and said throw adds, size, cost and weight to the device.

An ideal device is one that is easily brought into position to bear upon the jaw(s) once the pulling strand is installed and equally easily moved out of the way when the job is done to allow the jaws to slide a meaningful distance, enabling easy removal of the strand.

Figure 7:
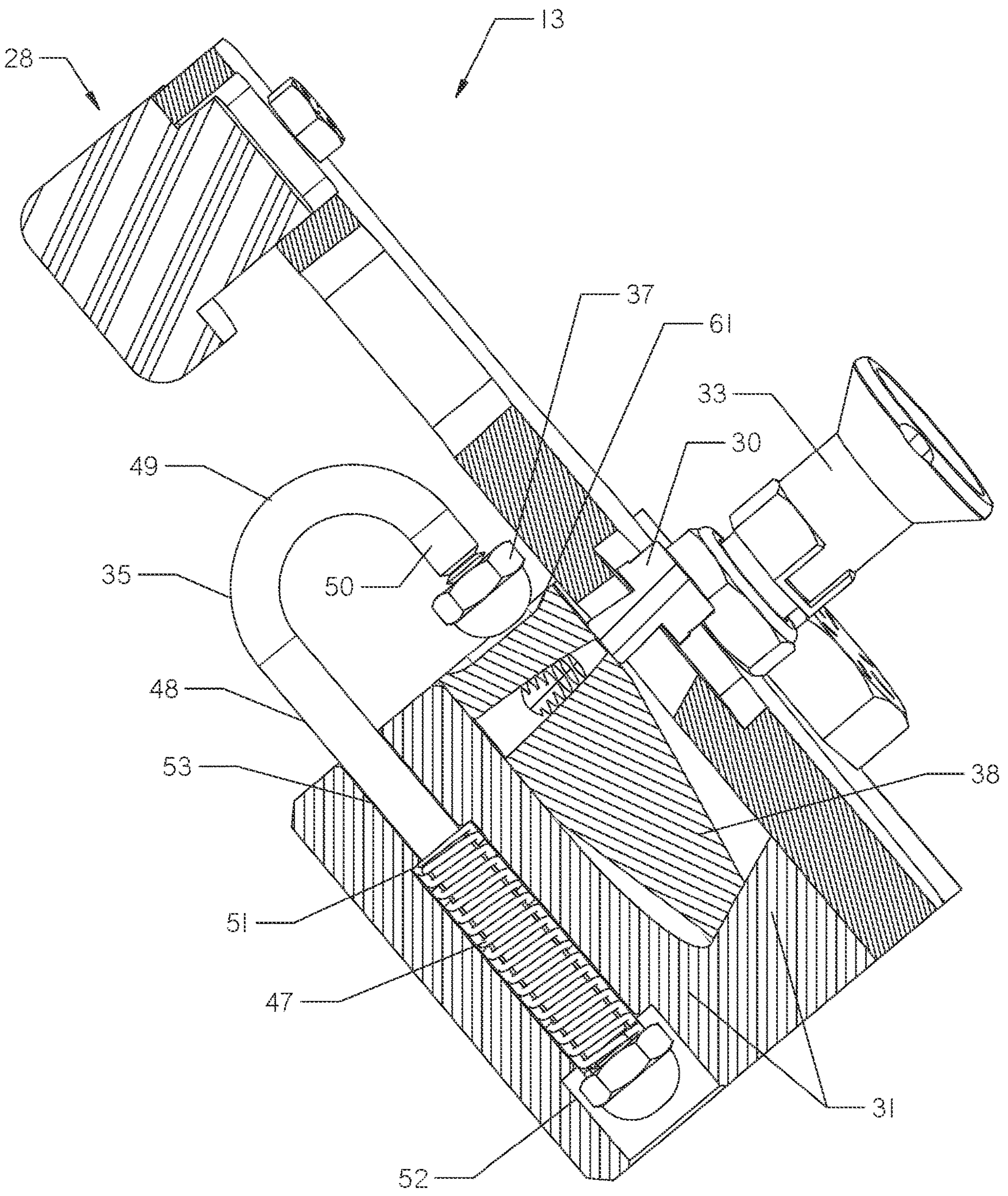
FIG. 7 is a sectional view of section A-A from FIG. 6 with the J-rods rotated to the first position and contacting the jaws.

Turning now to the figures in general, shown therein is a strand pulling apparatus 10 for gripping a strand 15. The apparatus 10 comprises a compression spring 47 and a ‘J’ shaped rod 35 contained within a jaw block 31. There is one J rod 35 and one spring 47 required per jaw 38, as best shown in FIG. 7. The short end of the J rod 35 bears upon the jaw 38 driving it into the jaw block taper 44 (FIG. 5) driven by the compression of the spring 47. As the J rod 35 can be rotated about the long side of the J within a mating bore in the jaw block 31, the short end of the J rod 35 can be rotated away from the jaw 38 to ‘park’ the mechanism while the strand 15 is being installed or removed from the apparatus 10. In this way, the apparatus 10 provides a way to overcome the limitations of current strand pulling mechanisms. A detailed description of the device of the figures is provided below.

Figure 1:
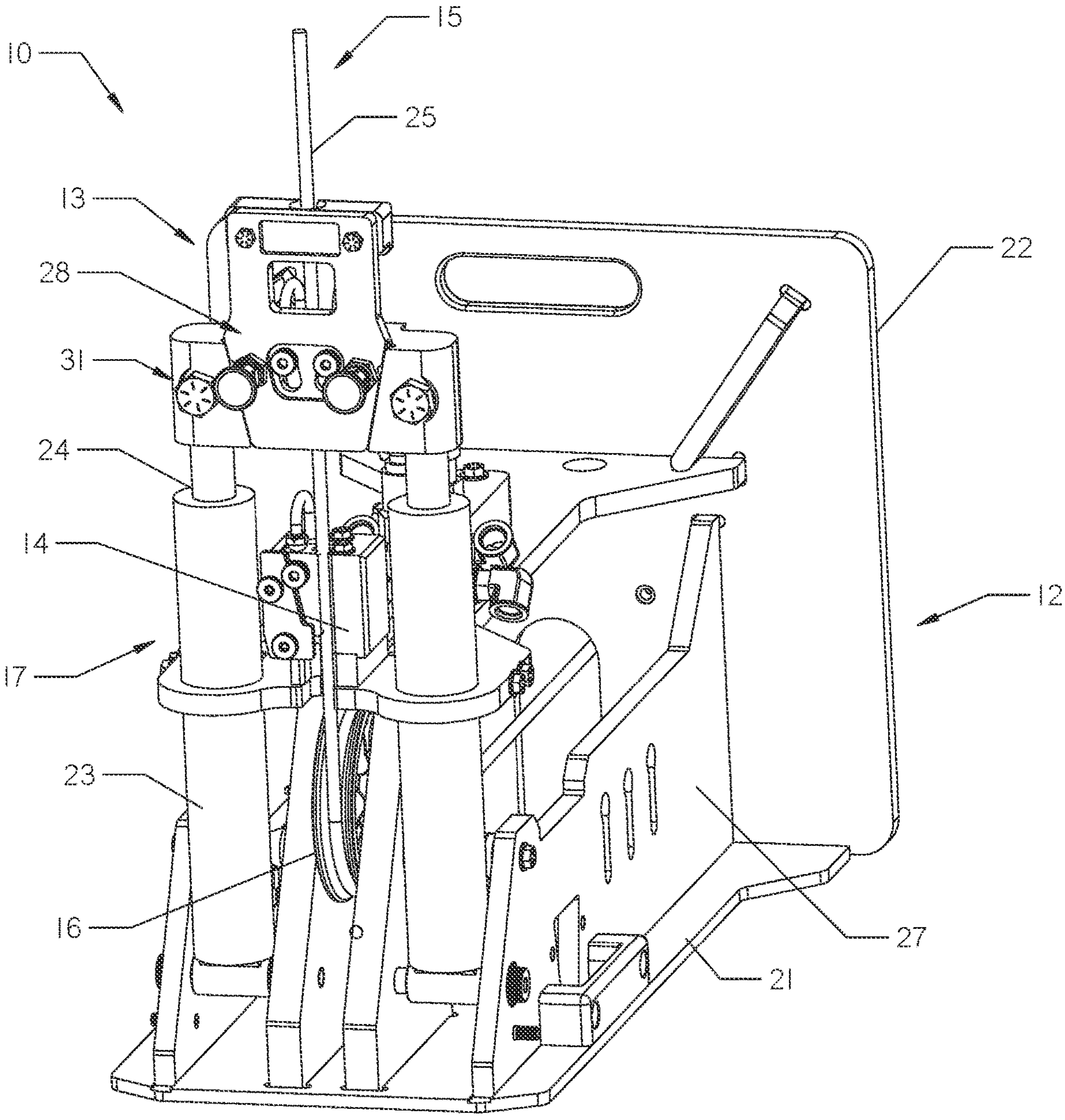
FIG. 1 is a rear isometric view of a strand pulling device. A jaw block assembly and jaw plate subassembly are shown in the top left of the image, with a wire strand within. A fixed jaw is disposed between the actuators of the pulling device.

With reference to FIG. 1, shown therein is the strand gripping apparatus 10. Such apparatus 10 may, for example, apply a maximum tensile force of 9 tons on a ⅜" diameter flexible wire strand 15. The strand 15 is disposed around a sheave 16 and has a horizontal run 26 and a vertical run 25 which are part of a continuous length.

The apparatus has a frame 12 which comprises a base 21 which may be flush with a ground surface, and a face 22 which typically shores a vertical face of an excavation. The strand 15 is disposed through an existing pipe (as a part of the horizontal run 26), and will have an expanding or bursting tool (not shown) at its distal end.

Two hydraulic actuators 17 provide the force which pulls the strand 15 through the existing utility. The actuators 17 are mounted to the frame 12. As shown, these actuators are attached to plates 27. The plates 27 allow force associated with pulling the strand 15 to be passed into the face 22 and the base 21.

The hydraulic actuators 17, as shown, are a pair of hydraulic cylinders. The actuators 17 are each comprised of a cylinder body 23 and extendable rod 24. A moving jaw assembly 13 is attached to the rod 24 end of the cylinders 17 and carried thereby.

The apparatus 10 further comprises a rebound strand jaw assembly 14. The rebound strand jaw assembly 14 restrains the strand 15 from reverse travel while moving jaw assembly 13 is retracted by the hydraulic actuators 17. Reverse travel of the strand 15 may occur due to elastic stretch over the length of horizontal run 26. By restraining rebound, each stroke of the cylinders 17, and thus the movable jaw assembly 13 is more productive. As shown, the rebound strand jaw assembly 14 may include a J-rod as will be discussed in detail with respect to the moving strand jaw assembly 13.

Figure 2:
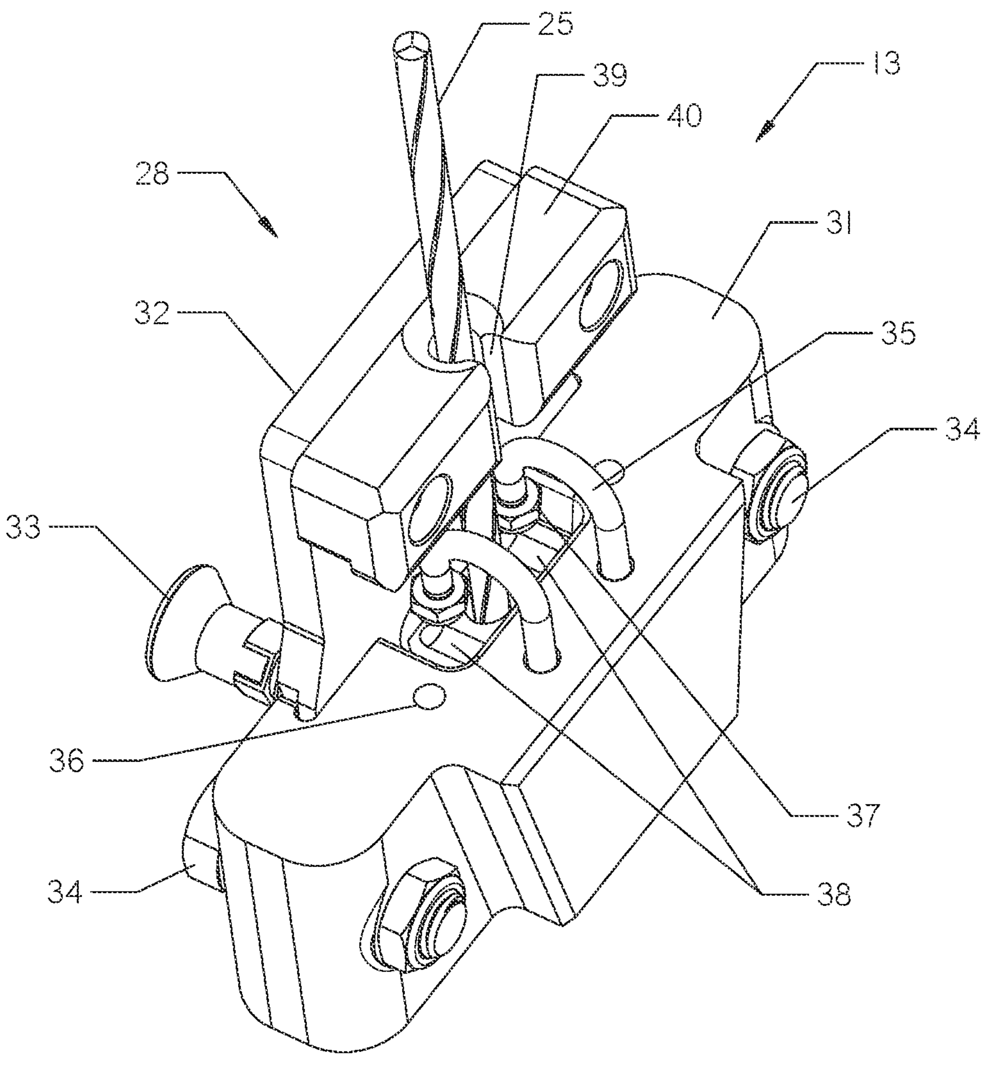
FIG. 2 is a top rear view of a moving jaw assembly with a wire strand disposed inside. A subassembly is disposed within a jaw block. Pins which connect the jaw block to actuators of the pulling assembly are shown, but the actuators are removed.
Figure 3:
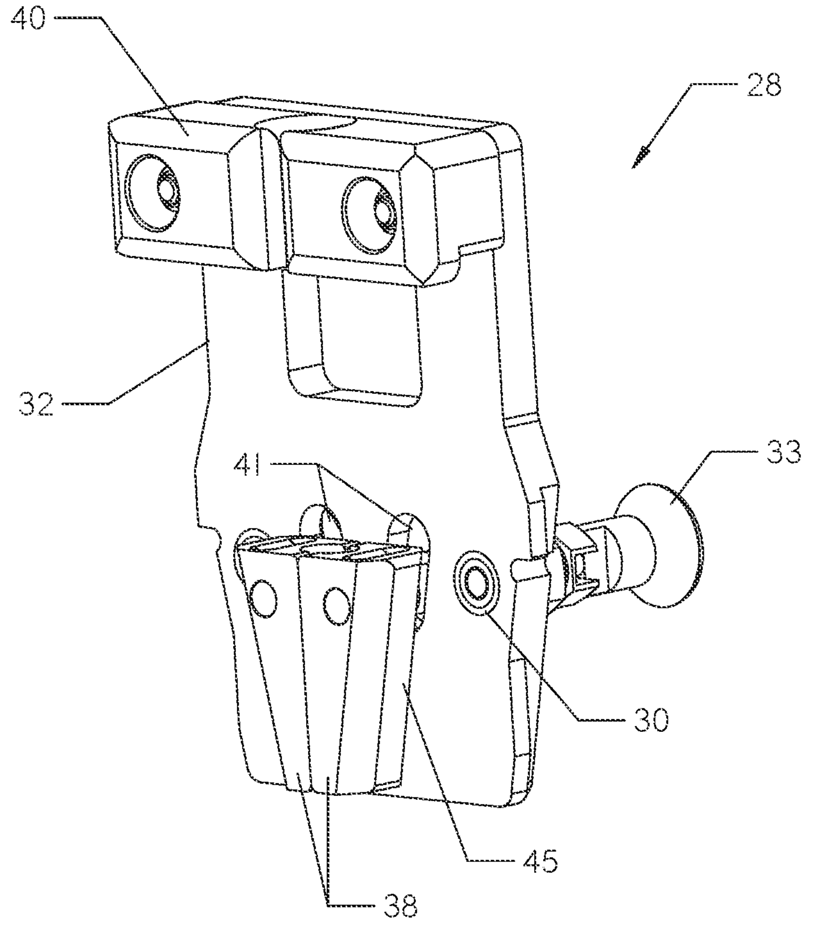
FIG. 3 is a rear view of the jaw plate subassembly for use with the system of claim 1. Jaws are shown next to a pair of slots. Pins securing the jaws within those slots are out of view on the back side of the figure.

With reference to FIGS. 2 and 3, the moving strand jaw assembly 13 is shown in more detail. In FIG. 2, the moving strand jaw assembly 13 is assembled for operation with a jaw subassembly 28, while the subassembly is shown detached from the jaw assembly 13 in FIG. 3. A plate 32 carries a rope guide 40 with a slot 39 to permit strand 15 installation and therefore guidance to vertical run 25 of the strand 15 as the actuators 17 cycle. This plate 32 is installed in a corresponding slot within a jaw block 31. The plate 32 carries spring plunger actuators 33 and jaws 38.

In FIG. 3, the spring plunger actuators 33 are shown in a retracted position, such that associated plungers 30 would not extend from the plate 32 and thus, when the jaw block 31 is in place as in FIG. 2, the plungers 33 would not bear against the jaw block 31. In FIG. 2, a spring plunger actuator 33 is shown in the engaged position. The spring plunger 33 holds a plunger 30 against the plate 32 of assembly 28, providing additional security between the subassembly 28 and the jaw block 31.

The cylinder assembly 17 is joined to the jaw block 31 by cylinder pins 34. The J-rods 35 are located in slip fit bores of the jaw block 31 and bear upon the tops of strand jaws 38 through spherical rod caps 37 that mount threadedly to J-rods 35. Parking divots 36 are located in the top face of the jaw block 31. These divots 36 provide a semi-secure location to position the J-rods 35 when not bearing against the jaws 38.

Jaws 38 hang loosely from the plate 32 via jaw handles 42 (FIG. 4) that pass through angled slots 41 in jaw plate 32. The jaws 38 are intended to slide on and react to wedging forces through tapered sliding surfaces 45. The slots 41 are similarly angled as tapered sliding surfaces 45 to provide free travel of jaws 38 along their mating sliding surface 45.

Figure 4:
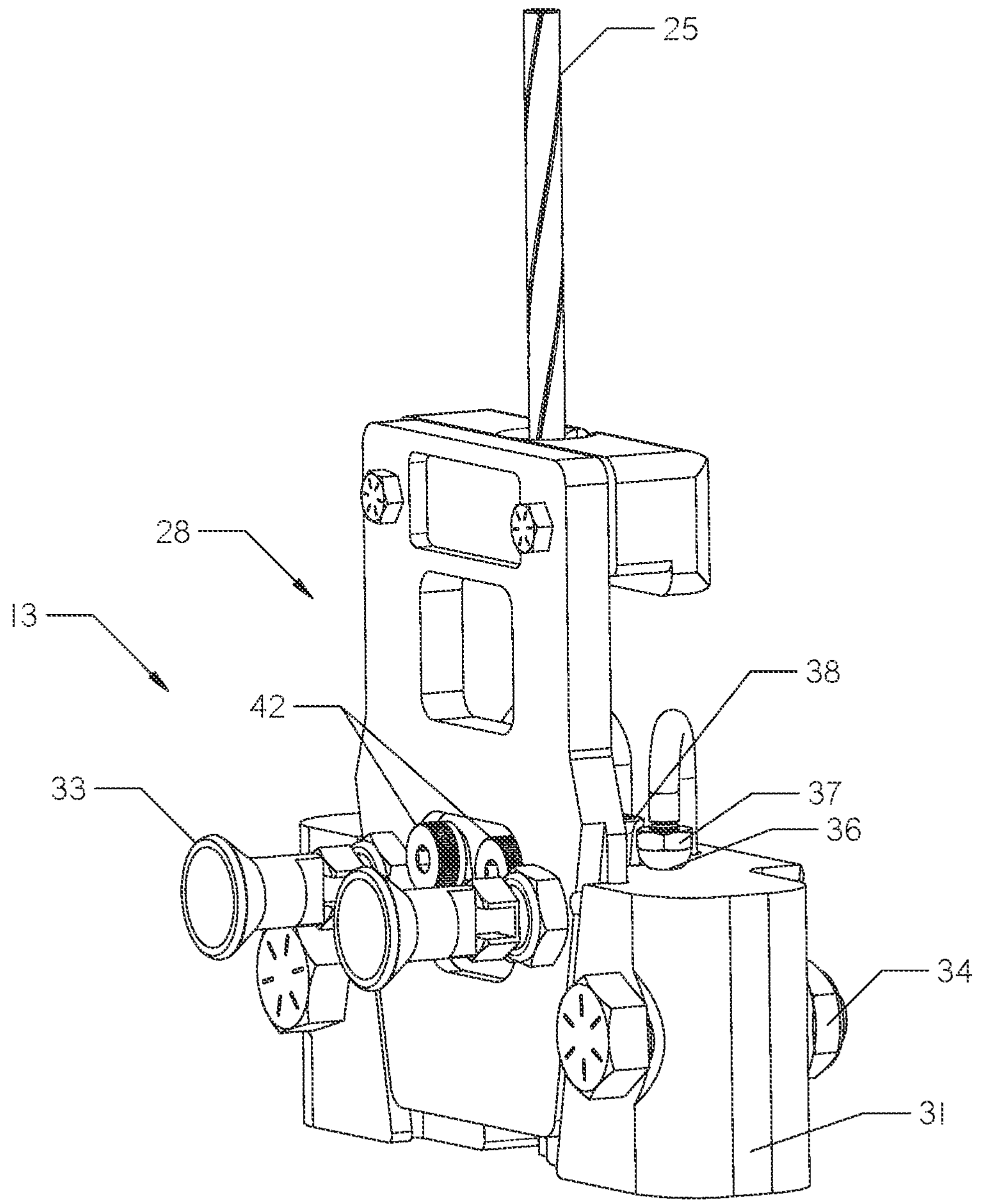
FIG. 4 is a front side view of the jaw plate subassembly located within the jaw block. J-rods are in a second position, and do not contact the jaws in FIG. 4.

With specific reference to FIG. 4, the strand jaw 38 is in the process of being either disassembled or assembled with respect to the jaw plate subassembly 28. Spring plungers 33 have been adjusted to the retracted position, freeing the subassembly 28 from the jaw block 31. The subassembly 28 is shown lifted upward slightly which is best done by supporting jaw handles 42.

This orientation allows the jaws 38 to separate sufficiently to pass around vertical run 25 of the strand 15. The jaw plate subassembly 28 may be pulled away from the vertical run 25 of the strand 15 thereby removing it from engagement with the vertical run 25 and the jaw block 31. To achieve this, the thrust force applied to jaws 38 must be removed. That is accomplished by twisting each of the J-rods 35 about their long stem in the jaw block 31 and placing the spherical rod cap 37 into parking divot 36 which takes them completely away from the jaw 38 travel path and permits jaw removal from strand jaw assembly 13.

Figure 5:
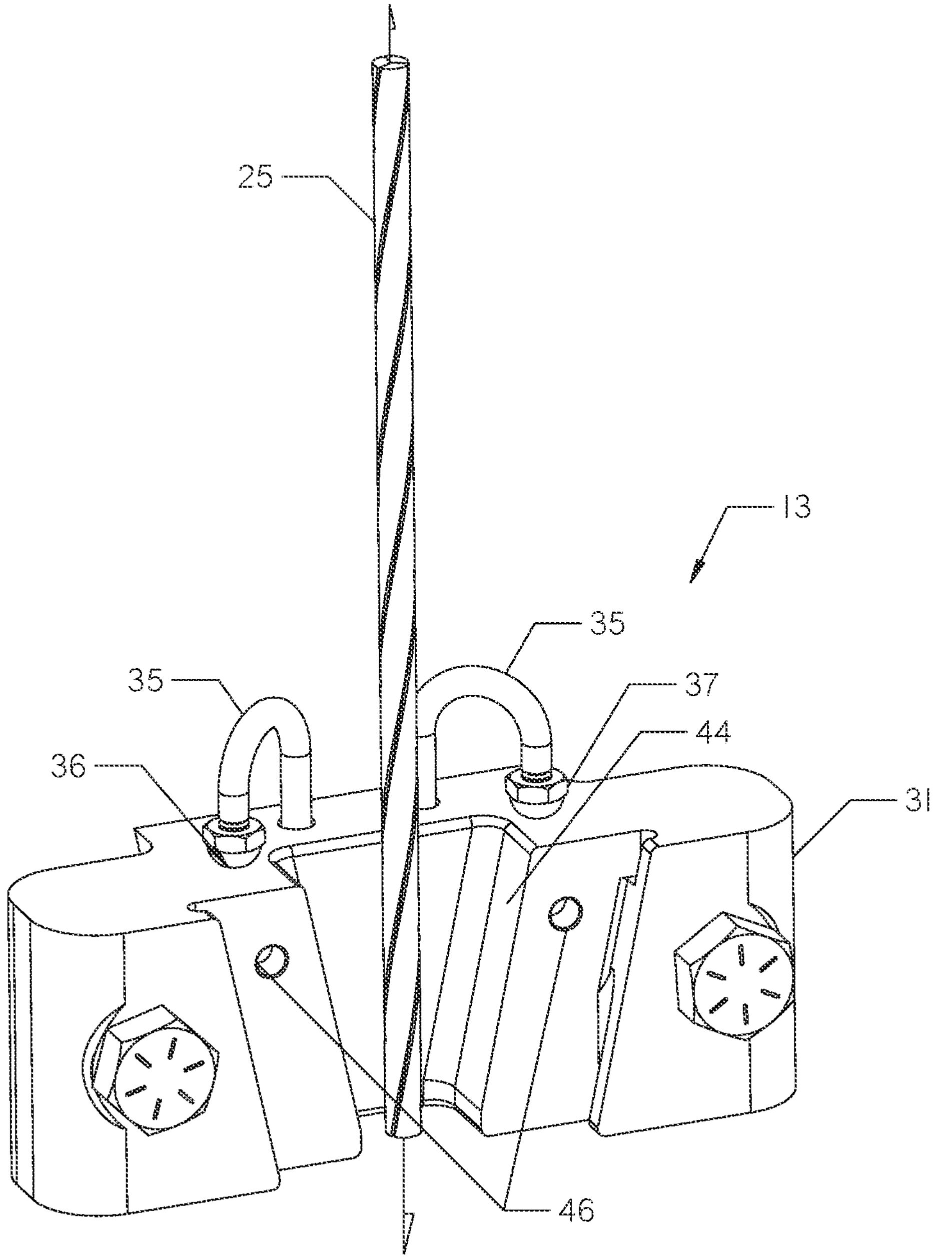
FIG. 5 is a front view of the jaw block assembly with the jaw plate subassembly removed and J-rods rotated to the second position.

With reference to FIG. 5, the jaw plate subassembly 28 is completely removed from moving strand jaw assembly 13, and the jaw block 31 is shown. The J-rods 35 are shown with their spherical rod cap 37 shifted to the parking divots 36. Plunger bores 46 where the spring plungers 33 engage the block 31 are shown. Further, a tapered jaw cavity or pocket 43 is revealed in jaw block 31. The jaws 38 (FIGS. 2-4) have tapered surfaces 45 interact with opposed, complementary tapered walls 44 of the tapered jaw pocket 43 to clamp the vertical run 25 of the strand 15. Tapered side walls 44 within the tapered jaw pocket 43 match the sliding surfaces 45 of jaws 38 (FIG. 4) to produce the wedging forces to frictionally engage strand run 25 when the strand jaw assembly 13 is in place. Each jaw 38 accordingly has a crush face which opposes its sliding surface 45, which enables the jaws 38 to, together, grip the strand 15.

Figure 6:
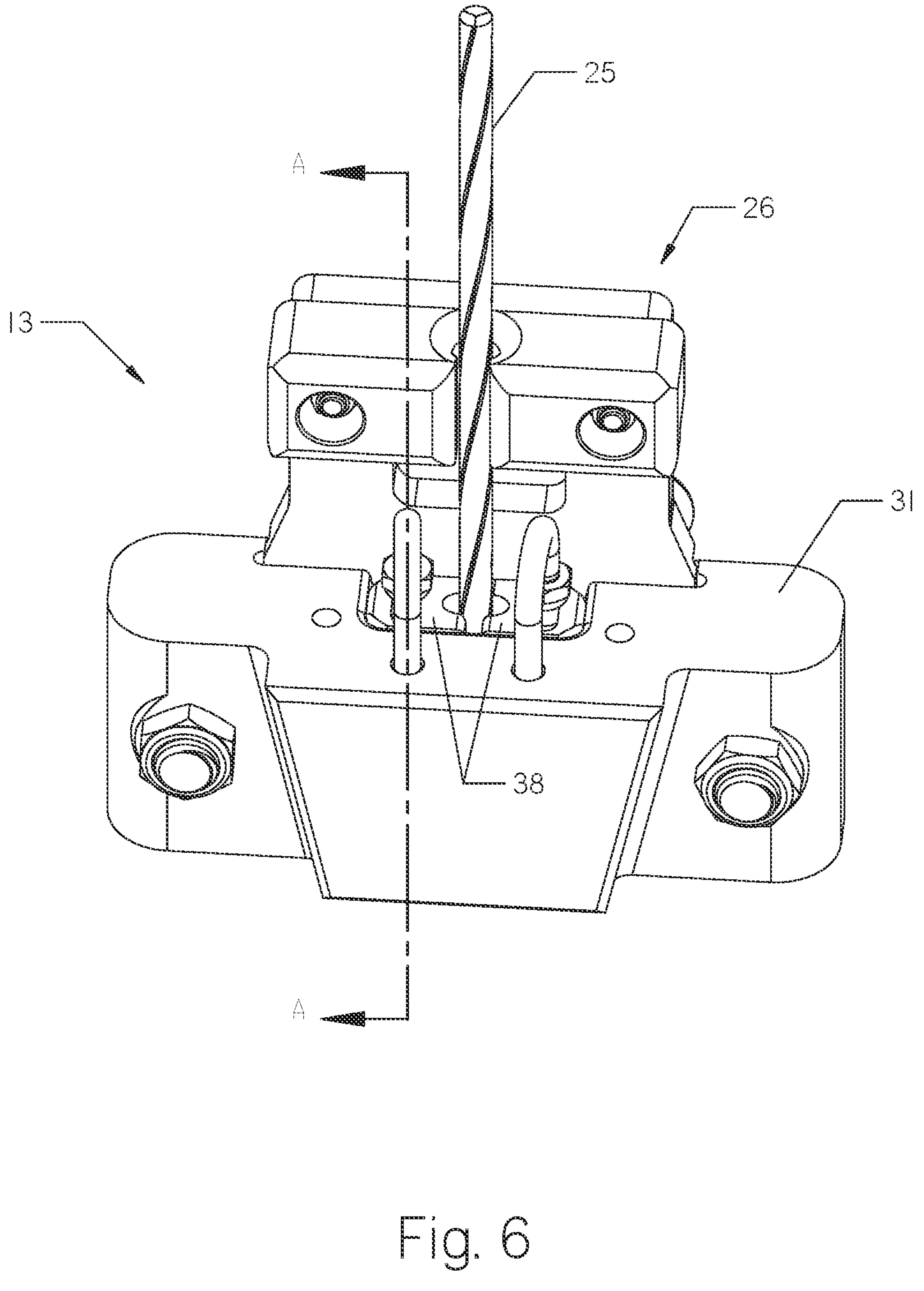
FIG. 6 is a top back view of the jaw block assembly with the J-rods rotated to engage with the jaw plate subassembly in the first position.

In FIGS. 6 and 7, the moving strand jaw assembly 13 is shown with the strand jaws 38 engaged by the J-Rods 35. The jaw block 31 includes bores 53 within which the J-rods 35 are located. The J-rods 35 include a long stem 48, an arc 49, and a short stem 50 terminating in the spherical rod cap 37. The long stem 48 is retained within the bore 53 by a coil spring 47. The coil spring 47 is disposed in a stepped cavity 51. The stepped cavity 51 is concentric with the bore 53, and allows the coil spring 47 to be retained by the end of the cavity 51 and a long stem spherical end 59. The long stem spherical end 59 may be within a second stepped bore 52 at the end of the long stem 48 of the J-rod 35.

The spherical rod cap 37 at the end of short stem 50 bears against the jaw 38 to thrust it along the tapered sliding surface 44 (FIG. 5). The long stem 48 is free to translate and rotate within the bore 53, subject to the bias of the spring 47 with regard to translation, and in the case of rotation, by the operator's actions. Rotating the J-rod 35 allows the spherical rod cap 37 to mate with the divots 36 or depressed features 61 in the top face of the jaws 38. While a spherical rod cap 37 and divots 36 or depressions 61 are shown, other mating features are known and may be used.

Load applied to each jaw 38 may range from 0.1 to 201b or more. There need only be one jaw 38 if a stationary reaction surface is used. In a multiple jaw 38 system only one jaw needs to be loaded, though both may be loaded, as shown.

The shape of the J-rod 35 minimizes the overall size of the system; however the same effective function could be achieved with other shapes if the spring were disposed above the jaw 38 and used to load a movable pin. In this condition, an offset must exist between the stem bearing on the jaw and the portion of the stem being urged by the compression spring, as the bend allows the rod end to be parked away from the jaw when free jaw movement is required for strand installation or removal.

Changes may be made in the construction, operation and arrangement of the various parts, elements, steps and procedures described herein without departing from the spirit and scope of the invention as described in the following claims.

The invention claimed is:

1. A gripping assembly, comprising:
a tapered jaw having at least one tapered surface;
a block having a tapered cavity, wherein the tapered cavity comprises at least one tapered surface complementary to the tapered surface of the tapered jaw;
a retainer having a J-shape comprising:
a first section defining a long end of the J-shape disposed within the block; and
a second section, offset from the first section and defining a short end of the J-shape, wherein the second section is defined by a first position and a second position, wherein:
the retainer contacts the tapered jaw when in the first position; and
the retainer does not contact the tapered jaw when in the second position; and
a coil spring disposed around the first section of the retainer;
wherein the tapered jaw is situated within the tapered cavity.

2. The gripping assembly of claim 1 in which the retainer is biased against the block by the coil spring.

3. The gripping assembly of claim 1 in which the first section of the retainer is disposed within a cavity of the block, in which the coil spring is configured to bias the retainer such that the second section pushes the jaw into the tapered cavity when the retainer is in the first position.

4. The gripping assembly of claim 3 further comprising a depression formed in the block, such that the second section of the retainer is configured to contact the depression when in the second position.

5. The gripping assembly of claim 1 in which the tapered jaw is characterized as a first tapered jaw and the retainer is characterized as a first retainer and further comprising:
a second tapered jaw, wherein the tapered cavity is complementary to the second tapered jaw, wherein the first tapered jaw and second tapered jaw are in opposition; and
a second retainer comprising a first section disposed within the block and a second section, offset from the first section, wherein the second section is defined by a first position and a second position, wherein:
the second retainer contacts the second tapered jaw when in the first position; and
the second retainer does not contact the second tapered jaw when in the second position; and
wherein the second tapered jaw is configured to be secured in the cavity when the second retainer is in the first position.

6. A wire pulling device, comprising:
a frame;
at least one actuator secured at a first end to the frame; and
the gripping assembly of claim 1, wherein the gripping assembly is connected to the at least one actuator at a second end.

7. The wire pulling device of claim 6 in which the at least one actuator is connected to the block.

8. The wire pulling device of claim 6 further comprising a recoil jaw assembly, wherein the recoil jaw assembly is secured to and stationary relative the frame and comprises:
a tapered jaw situated within a tapered cavity formed within the recoil jaw assembly.

9. A system comprising:
a wire strand, and
the wire pulling device of claim 8, wherein the wire strand is disposed within the tapered cavity of the block and the tapered cavity of the recoil jaw assembly.

10. The wire pulling device of claim 8 in which the tapered jaw of the recoil jaw assembly and the tapered jaw of the gripping assembly are tapered in the same direction.

11. A method for using the gripping assembly of claim 1, comprising:
placing the retainer in the second position;
sliding the tapered surface of the tapered jaw away from the tapered surface of the tapered cavity;
placing a wire strand within the tapered cavity;
sliding the tapered surface of the tapered jaw toward the tapered surface of the tapered cavity; and
placing the retainer in the first position.

12. A gripping assembly, comprising:
a jaw block defining a tapered cavity, wherein the tapered cavity defines first and second opposed tapered surfaces;
a subassembly, comprising:
a plate, slidingly receivable in the jaw block, the plate defining first and second slots;
a first tapered jaw secured to the plate by a first pin, wherein the first pin is disposed through the first slot, the first tapered jaw defining a first crush face and a first tapered jaw surface; and
a second tapered jaw secured to the plate by a second pin, wherein the second pin is disposed through the second slot, the second tapered jaw defining a second crush face and a second tapered jaw surface;
wherein the first tapered jaw and the second tapered jaw are situated within the tapered cavity such that:
the first crush surface and the second crush surface are opposed;
the first tapered jaw surface is adjacent and complementary to the first opposed tapered surface of the tapered cavity; and
the second tapered jaw surface is adjacent and complementary to the second opposed tapered surface of the tapered cavity;
a first retainer disposed through the jaw block and having a first position and a second position, wherein the first retainer contacts the first jaw and biases the first tapered jaw surface towards the first tapered surface of the tapered cavity when the first retainer is in the first position; and
a second retainer disposed through the jaw block and having a first position and a second position, wherein the second retainer contacts the second jaw and biases the second tapered jaw surface towards the second tapered surface of the tapered cavity when the second retainer is in the first position;
wherein the first retainer and the second retainer are characterized by a J-shape, wherein each of the first retainer and the second retainer comprise a long first section disposed within the block and a short second section, wherein the short second section of each retainer contacts its respective jaw when in the first position.

13. The gripping assembly of claim 12 further comprising:
a plunger disposed on the plate and movable to secure the plate relative to the block.

14. The gripping assembly of claim 12 further comprising:

a first spring disposed about the long first section of the first retainer; and a second spring disposed about the long first section of the second retainer;

wherein the first spring biases the first retainer in a first direction and the second spring biases the second retainer in the first direction; and wherein the first direction is in the direction of a narrow end of the tapered cavity.

15. The gripping assembly of claim 14 in which the first retainer and the second retainer are J shaped and rotatable relative to the block.

16. A system comprising:

a frame;

at least one actuator; and the gripping assembly of claim 12;

wherein the at least one actuator extends and contracts to move the gripping assembly relative to the frame.

17. The system of claim 16 further comprising a wire strand, and wherein:

the frame comprises a sheave; and the wire strand is disposed around the sheave such that a first length of the wire strand is substantially perpendicular to a second length of the wire strand; and wherein the first length of the wire strand is at least partially underground and a portion of the second length of the wire strand is between the first crush face and the second crush face.

* * * * *